(12) United States Patent
Vaccaro et al.

(10) Patent No.: US 10,840,679 B2
(45) Date of Patent: Nov. 17, 2020

(54) DEVICES FOR HOISTING CABLES

(71) Applicant: CommScope Technologies LLC, Hickory, NC (US)

(72) Inventors: Ronald A. Vaccaro, Taylorsville, NC (US); Aviral Joshi, Chicago, IL (US); Christopher R. Stockman, Bella Vista, AR (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/518,322

(22) Filed: Jul. 22, 2019

(65) Prior Publication Data

US 2020/0036171 A1 Jan. 30, 2020

Related U.S. Application Data (60) Provisional application No. 62/737,344, filed on Sep. 27, 2018, provisional application No. 62/703,458, filed on Jul. 26, 2018.

(51) Int. Cl.
*H02G 1/04* (2006.01)
*B66C 1/62* (2006.01)
*B66C 1/12* (2006.01)

(52) U.S. Cl.
CPC ............... *H02G 1/04* (2013.01); *B66C 1/62* (2013.01); *B66C 1/12* (2013.01)

(58) Field of Classification Search
CPC .. H02G 1/04; H02G 1/081; B66C 1/12; F16G 11/00; F16G 11/02; F16G 11/025; F16G 11/03

USPC ..... 294/82.1, 82.11, 82.14, 86.42; 24/115 A, 24/115 R, 115 G, 115 N, 128, 129 R, 24/129 B, 129 D; 248/58, 59, 60, 61, 63

See application file for complete search history.

(56) References Cited

U.S. PATENT DOCUMENTS

| | | | | |
|---|---|---|---|---|
| 2,309,971 A | * | 2/1943 | McLarn ................. | H01B 17/12 174/158 R |
| 2,669,761 A | * | 2/1954 | Hower ................. | A01G 23/003 403/177 |
| 2,914,139 A | | 11/1955 | Rose | |
| 2,740,178 A | * | 4/1956 | Kellems ................ | H02G 1/081 294/86.42 |
| 3,133,725 A | * | 5/1964 | Lanum .................. | H02G 1/081 254/134.3 R |
| 3,294,053 A | * | 12/1966 | Emery, Jr. .............. | B63B 34/67 114/249 |

(Continued)

FOREIGN PATENT DOCUMENTS

| KR | 19920006690 | 8/2004 |
|---|---|---|

OTHER PUBLICATIONS

International Search Report and Written Opinion corresponding to International Application No. PCT/US2019/042747 dated Nov. 7, 2019.

*Primary Examiner* — Dean J Kramer
(74) *Attorney, Agent, or Firm* — Myers Bigel, P.A.

(57) ABSTRACT

The present disclosure describes devices and assemblies for hoisting cables. A hoisting grip may comprise a main body formed of a polymeric material, the main body having a length, a width, a thickness, and a longitudinal axis and comprising a plurality of apertures where at least one aperture may be adapted to receive a hoisting member and at least two apertures may be adapted to receive a cable.

13 Claims, 9 Drawing Sheets

(56) References Cited

U.S. PATENT DOCUMENTS

| | | | | |
|---|---|---|---|---|
| 4,225,172 | A * | 9/1980 | Marquardt | F16G 11/03 |
| | | | | 294/74 |
| 4,323,273 | A * | 4/1982 | Sword | B66C 1/12 |
| | | | | 294/74 |
| 4,354,705 | A | 10/1982 | Shorey et al. | |
| 4,368,910 | A * | 1/1983 | Fidrych | D07B 1/18 |
| | | | | 24/115 N |
| 5,058,243 | A * | 10/1991 | Rasmussen | B60P 7/0823 |
| | | | | 24/68 CD |
| 5,823,242 | A * | 10/1998 | Huang | E06B 9/326 |
| | | | | 160/178.1 R |
| 5,938,181 | A * | 8/1999 | Holden | H02G 1/081 |
| | | | | 254/134.3 FT |
| 6,193,217 | B1 * | 2/2001 | Zimmer | G02B 6/4465 |
| | | | | 254/134.3 FT |
| 6,317,935 | B1 * | 11/2001 | O'Rouke | A62B 1/04 |
| | | | | 24/115 K |
| 10,253,906 | B2 | 4/2019 | Vaccaro | |
| 2004/0159070 | A1 | 8/2004 | Hansort | |
| 2013/0106124 | A1 | 5/2013 | Leblanc | |
| 2014/0265390 | A1 * | 9/2014 | Yale | B66C 1/12 |
| | | | | 294/74 |

\* cited by examiner

DEVICES FOR HOISTING CABLES

RELATED APPLICATION(S)

The present application claims priority from and the benefit of U.S. Provisional Application No. 62/703,458, filed Jul. 26, 2018 and U.S. Provisional Application No. 62/737,344, filed Sep. 27, 2018, the disclosures of which are hereby incorporated herein in their entirety.

FIELD OF THE INVENTION

The invention relates to devices for hoisting cables.

BACKGROUND OF THE INVENTION

Currently, there a variety of metallic (e.g., stainless steel) hoisting grips that are used to hoist cables to the top of telecommunications towers. However, the use of metal components near an antenna on cell sites can be a source of unwanted passive intermodulation (PIM) in the modern radio frequency (RF) environment. There may be a need for non-metallic, non-magnetic hoisting grips for small diameter cables used in small cell telecommunications towers that reduce costs and allow for easy installation, while alleviating technical performance concerns, such as, PIM.

SUMMARY OF THE INVENTION

A first aspect of the present invention is directed to a hoisting grip. The hoisting grip comprises a main body formed of a polymeric material. The main body has a length, a width, a thickness, and a longitudinal axis. The main body further comprises a plurality of apertures with at least one aperture being adapted to receive a hoisting member and at least two apertures being adapted to receive a cable. The hoisting grip further comprises at least two laces attached to or integral with an end of the main body that are adapted to secure the cable to the hoisting grip.

Another aspect of the present invention is directed to a hoisting grip assembly. The hoisting grip assembly comprises a hoisting grip having a main body formed of a polymeric material. The main body has a length, a width, a thickness, and a longitudinal axis. The main body further comprises a plurality of apertures with at least one aperture being adapted to receive a hoisting member and at least two apertures being adapted to receive a cable. The hoisting grip assembly further comprises a cable received through at least two apertures of the hoisting grip, thereby securing the cable in the hoisting grip.

A further aspect of the present invention is directed to a hoisting grip assembly. The hoisting grip assembly comprises a hoisting grip having a main body formed of a polymeric material. The main body of the hoisting grip has a length, a width, a thickness, and a longitudinal axis. The main body further comprises a plurality of apertures with at least one aperture being adapted to receive a hoisting member. The hoisting grip assembly further comprises at least one cable hanger received in one of the apertures and a cable secured in the cable hanger.

A further aspect of the present invention is directed to a hoisting grip assembly. The hoisting grip assembly comprises at least one module having a main body with a length and a width. The module comprises a plurality of off-centered apertures relative to a longitudinal axis of the main body, a first connecting member extending the length of one end of the main body, and a second connecting member extending the length of an end of the main body opposite from the first connecting member. The first connecting member is sized to receive the second connecting member of another module and the second connecting member is sized to be optionally received by the first connecting member of another module. The hoisting grip assembly further comprises at least one cable hanger received in one of the apertures and a cable secured in the cable hanger.

A further aspect of the present invention is directed to a hoisting grip assembly. The hoisting grip assembly comprises a cable, at least one hoisting member having a knot at one end, and a clamping member surrounding the at least one hoisting member and the cable. The clamping member secures the hoisting member together with the cable.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10")

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Figure 1A:
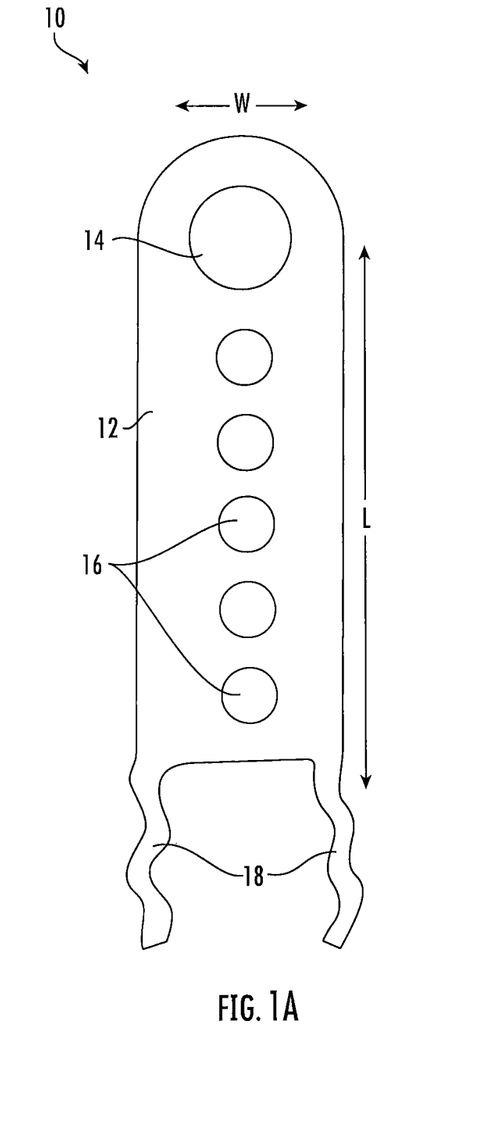
FIG. 1A is a front view of a hoisting grip according to embodiments of the present invention.
Figure 1B:
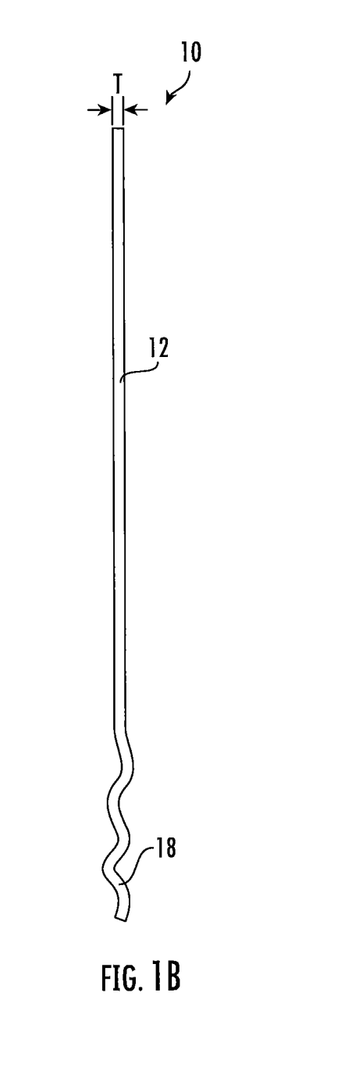
FIG. 1B is a side view of the hoisting grip of FIG. 1A.

Referring now to the figures, a hoisting grip 10 according to some embodiments of the present invention is illustrated in FIGS. 1A and 1B. The hoisting grip 10 comprises a main body 12. The main body 12 has a length (L), a width (W) and a thickness (T). In some embodiments, the main body 12 of the hoisting grip 10 has a length (L) of about 75 mm to about 400 mm, a width (W) of about 25 mm to about 100 mm, and a thickness (T) of about 1 mm to about 8 mm.

Figure 2A:
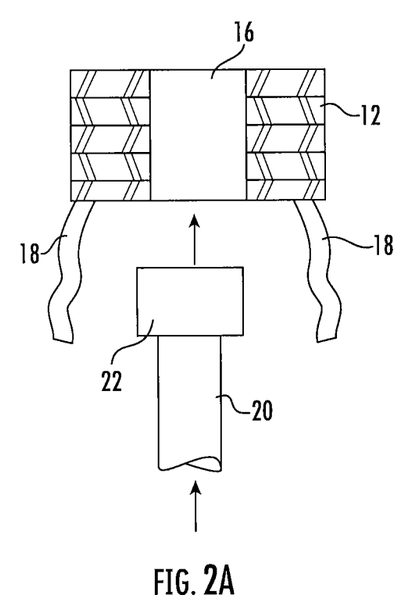
FIGS. 2A and 2B show a front view of a cable being inserted into the hoisting grip of FIG. 1A, wherein the hoisting grip is folded back upon itself in accordion fashion.
Figure 2B:
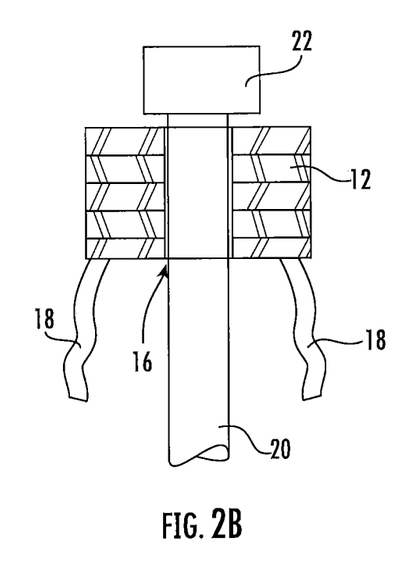

In some embodiments, the main body 12 of the hoisting grip 10 may comprise a plurality of apertures 16. In some embodiments, at least two of the apertures 16 may be adapted to receive a cable 20 (see, e.g., FIGS. 2A and 2B). In some embodiments, at least one of the apertures 16 may be adapted to receive a hoisting member 42 (see, e.g., FIG. 5). In some embodiments, the aperture adapted to receive a hoisting member 42 may be larger than the apertures 16 adapted to receive a cable 20 (see, e.g., aperture 14 in FIG. 1A). In some embodiments, the aperture 14 adapted to receive a hoisting member 42 may be reinforced to further support the hoisting grip 10 when being hoisted by a hoisting member 42. For example, the aperture 14 may have a reinforcement molded or metal insert around its periphery, be ringed with a raised rim, or the like.

As shown in FIG. 1A, in some embodiments, the apertures 14, 16 may be arranged in a straight line along a longitudinal axis of the main body 12 of the hoisting grip 10. In some embodiments, the apertures 14, 16 may be staggered on the main body 12. In some embodiments, the apertures 14, 16 are equally spaced apart from each other. In general, the apertures 14, 16 may be spaced apart about 1 inch to about 3 inches from each other. The spacing between the apertures 14, 16 can be simultaneously shortened by increasing their diameters.

In some embodiments, the hoisting grip 10 may comprise at least two laces 18. The laces 18 may be attached to or integral with an end of the main body 12 of the hoisting grip 10 and may be adapted to secure a cable 20 in the hoisting grip 10. For example, the laces 18 may be wound around the cable 20 and tied in a knot, thereby securing the cable 20 to the hoisting grip 10 (see, e.g., FIG. 4).

In some embodiments, the main body 12 may be formed from a polymeric or elastomeric material. In some embodiments, the polymeric or elastomeric material may comprise polyurethane, rubber, acrylonitrile butadiene styrene (ABS), or the like. Different polymeric or elastomeric materials will have different coefficients of friction which may affect the ability of the hoisting grip 10 to secure a cable 20 to be hoisted. In addition, the durometer (i.e., hardness) of the polymeric or elastomeric material that forms the main body 12 may affect the performance of the hoisting grip 10. For example, the durometer may affect the stretch, slippage, and/or tensile strength of the hoisting grip 10. In some embodiments, the hoisting grip 10 may withstand a load of at least about 100 pounds.

Referring now to FIGS. 2-5, in some embodiments, a cable 20 can be secured in the hoisting grip 10. In some embodiments, a cable 20 can be secured in the hoisting grip 10 by first folding the hoisting grip 10 back on itself (like an accordion) such that the apertures 16 are aligned. When aligned, the apertures 16 form a "channel" that the cable 20 can be inserted through (see, e.g., FIG. 2A). The cable 20 can then be pushed through this "channel" formed by the apertures 16 (see, e.g., FIG. 2B). In some embodiments, the cable 20 may have a connector 22 at one end. The polymeric or elastomeric material that forms the hoisting grip 10 gives the hoisting grip 10 a certain degree of flexibility, such that the diameters of the apertures 16 may be stretched to allow the connector 22 of the cable 20 to pass through. After the cable 20 passes through the apertures 16, the resilient nature of the polymeric or elastomeric material allows the apertures 16 to recover to their original diameter, thereby securing the cable 20 to the hoisting grip 10.

The shape and/or size of the apertures 14, 16 can vary depending on a number of factors, for example, the size of the cable 20 and connector 22 to be inserted through the apertures 16 or the size of hoisting member 42 that may be received by aperture 14. In some embodiments, the shape of the apertures 14, 16 may be round or oval (elliptical). The shape of the apertures 14, 16 may improve cable slippage from the hoisting grip 10 and/or the overall strength of the hoisting grip 10. For example, when the shapes of the apertures 14, 16 are oval or elliptical with the smaller axis of the oval arranged vertically, and the larger axis in the horizontal direction, the apertures 14, 16 can be effectively larger in diameter to push a connector 22 of the cable 20 through, yet effectively smaller in diameter when a load is applied to the hoisting grip 10.

In some embodiments, the diameter of the apertures 14, 16 may be about 6 mm to about 25 mm, typically about 18 mm to about 20 mm. At least two of the apertures 16 may be adapted to receive cables 20 having a diameter, or a diameter over jacket (DOJ), of about 0.25 inches to about 0.5 inches. In general, the hoisting grip 10 may have an interference fit with the cable 20 (i.e., the difference between cable DOJ and aperture DOJ) of about 3 mm to about 4 mm.

Figure 3A:
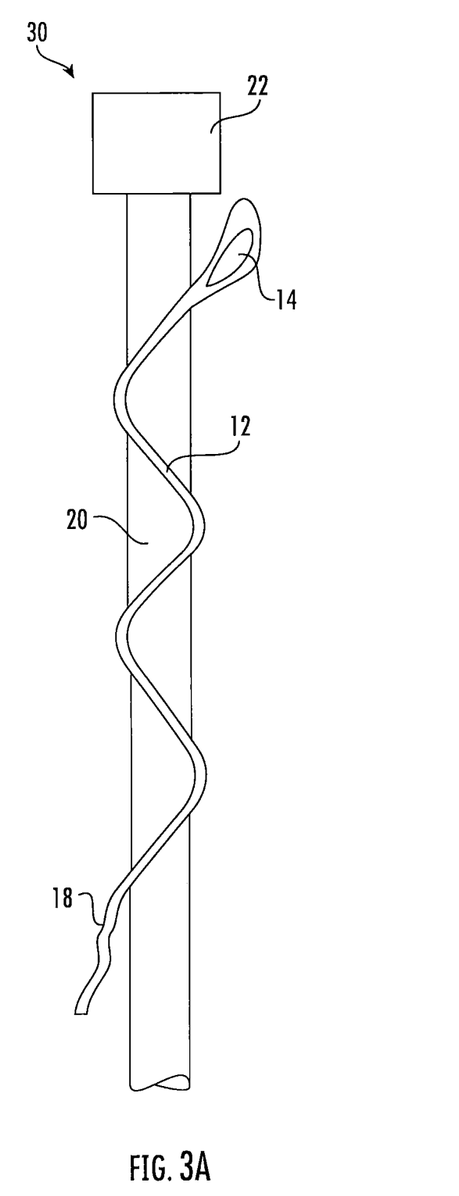
FIG. 3A is a side view of the hoisting grip of FIG. 1A in combination with a cable, with the hoisting grip in a serpentine configuration.
Figure 3B:
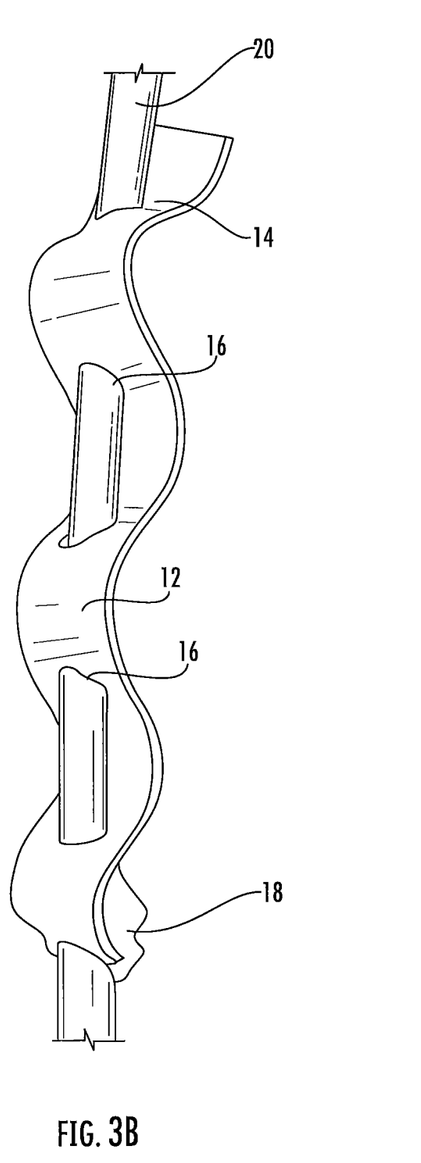
FIG. 3B is a front perspective view of the hoisting grip of FIG. 3A in combination with a cable.
Figure 4:
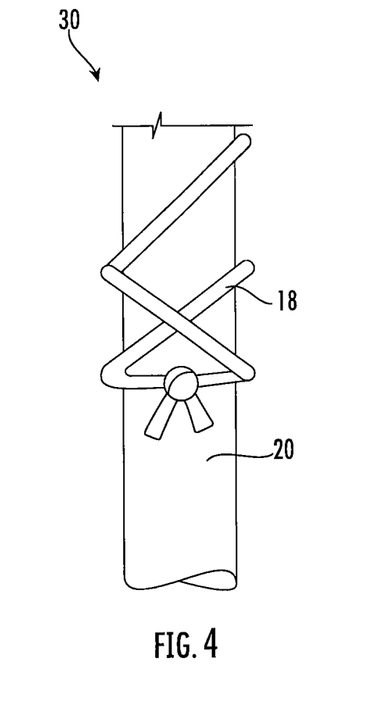
FIG. 4 is an enlarged view of the hoisting grip of FIG. 1A showing the laces securing the cable to the hoisting grip.

As shown in FIGS. 3A and 3B, once the cable 20 is pushed through the apertures 16, the main body 12 can be extended (unfolded). Surface friction between the hoisting grip 10 and the cable 20 can help secure the cable in the hoisting grip 10. When extended with the cable 20 inserted through the apertures 16, the main body 12 of the hoisting grip 10 may have a serpentine profile (FIG. 3A). When a load force is applied to the hoisting grip 10 (e.g., the force exerted on the hoisting grip 10 by the weight of the cable 20 when the hoisting grip 10 is being lifted by a hoisting member 42), the profile of the hoisting grip 10 may stretch and/or become somewhat straighter. As discussed above, in some embodiments, at least two laces 18 may be wound around the cable 20 and tied in a knot. These laces 18 can help to further secure the cable 20 in the hoisting grip 10 (FIG. 3B). FIG. 4 shows an enlarged view of how the laces 18 may be tied in a knot around the cable 20.

Figure 5:
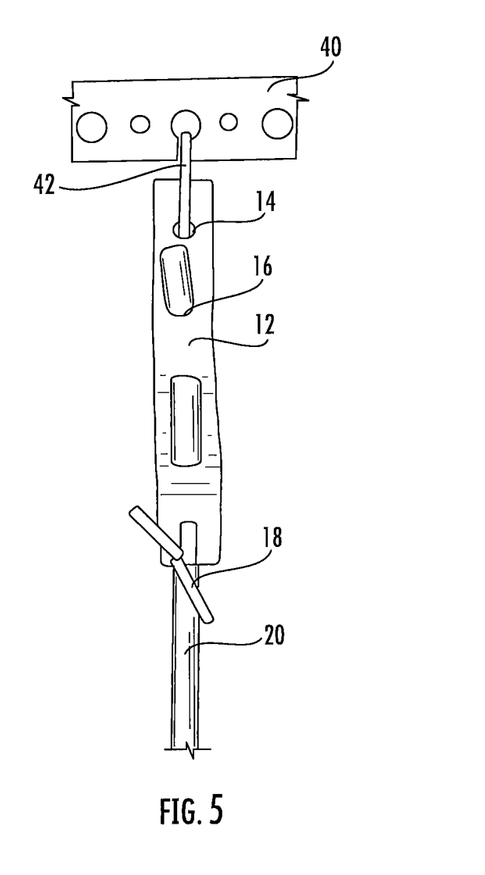
FIG. 5 is a front view of the hoisting grip assembly shown FIG. 3A and FIG. 3B hanging from a mounting structure.

When a cable 20 is secured in the hoisting grip 10, the combination of the hoisting grip 10 and cable 20 can be hoisted to the top of a mounting structure 40 for installation of the cable 20. In some embodiments, at least one of the apertures 14 may be adapted to receive a hoisting member 42 and at least two of the apertures 16 may be adapted to receive a cable 20. For example, as shown in FIG. 5, a cable 20 is received by the apertures 16 and secured in the hoisting grip 10. The cable 20 is further secured to the hoisting grip 10 by laces 18 which have been tied in a knot. The hoisting grip 10 has been hoisted up a mounting structure 40 by a hoisting member 42 which is received by the aperture 14 of the hoisting grip 10. The hoisting grip 10 may be secured to the mounting structure 40 and may remain as a permanent part of the cable installation.

Figure 6:
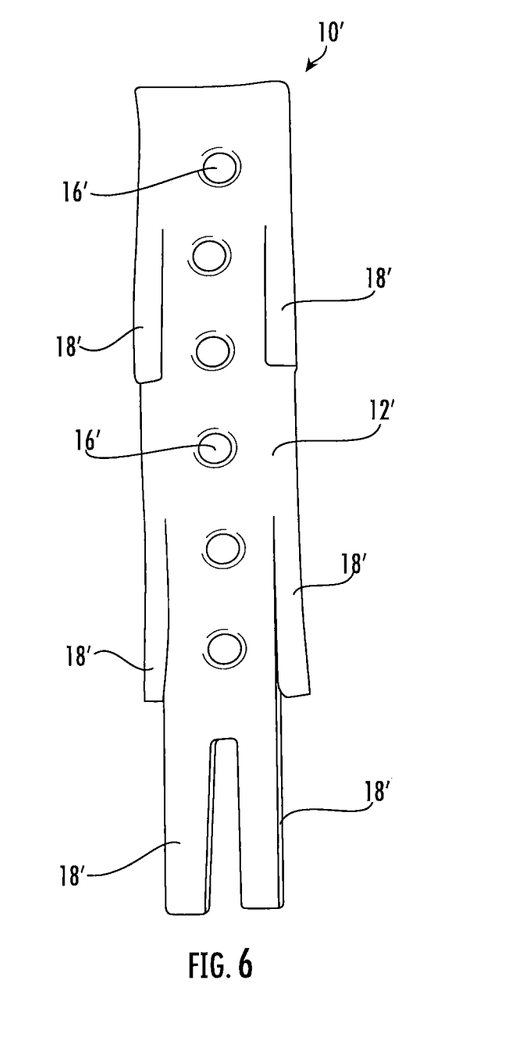
FIG. 6 is a front view of the hoisting grip of FIG. 1A having multiple pairs of laces.
Figure 7A:
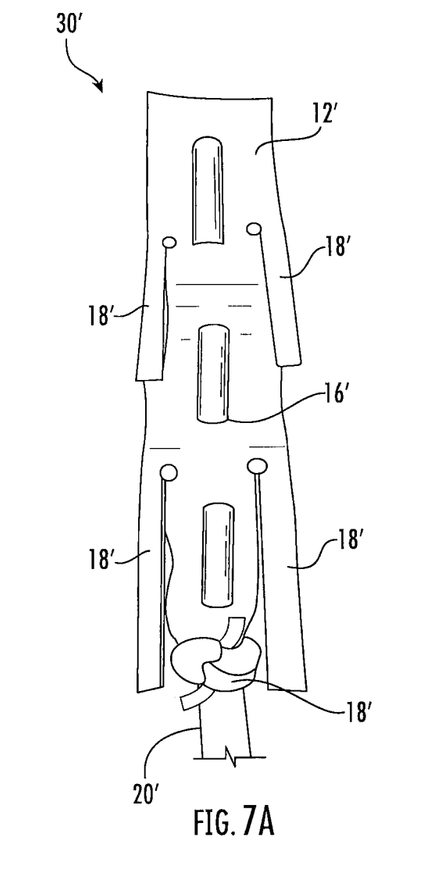
FIGS. 7A-7C are front perspective views of the hoisting grip of FIG. 6 in combination with a cable.
Figure 7B:
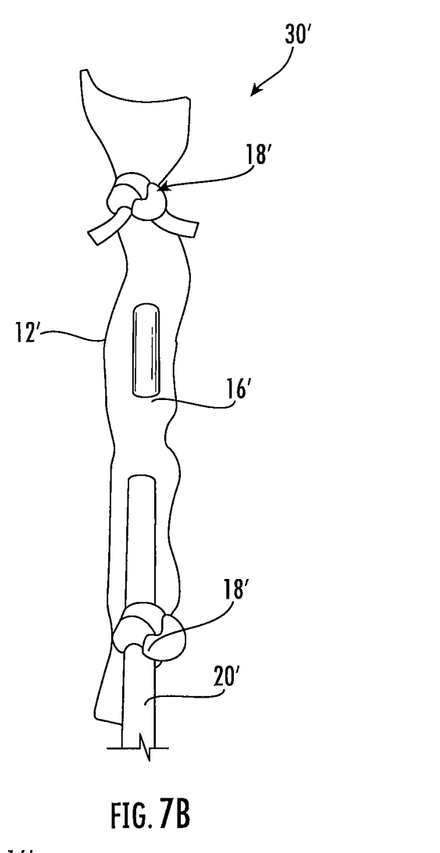
Figure 7C:
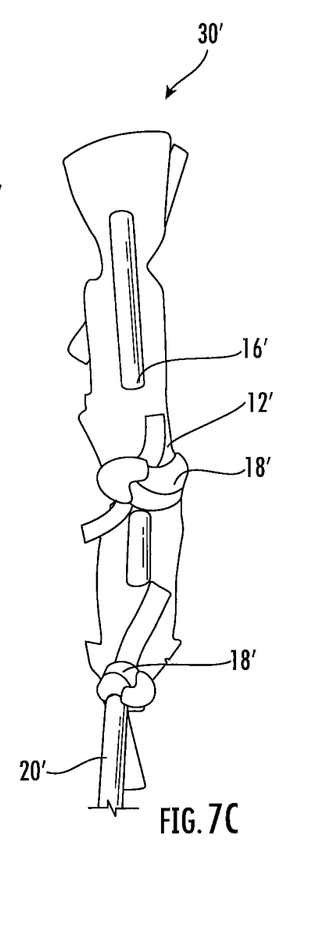

Referring now to FIG. 6 and FIGS. 7A-7C, in some embodiments, a hoisting grip 10' may have more than two laces 18'. In some embodiments, the hoisting grip 10' may have 2, 4, 6, 8, 10 or more laces 18'. For example, as shown in FIG. 6, the hoisting grip 10' may have six laces 18' (i.e., three sets of two laces 18'). As shown in FIGS. 7A-7C, the additional laces 18' can help to further secure the cable 20' in the hoisting grip 10'. The additional laces 18' may improve or eliminate cable slippage from the hoisting grip 10' and may also allow a larger range of cable sizes (e.g., heavier cables 20') to be used with the hoisting grip 10'.

Figure 8A:
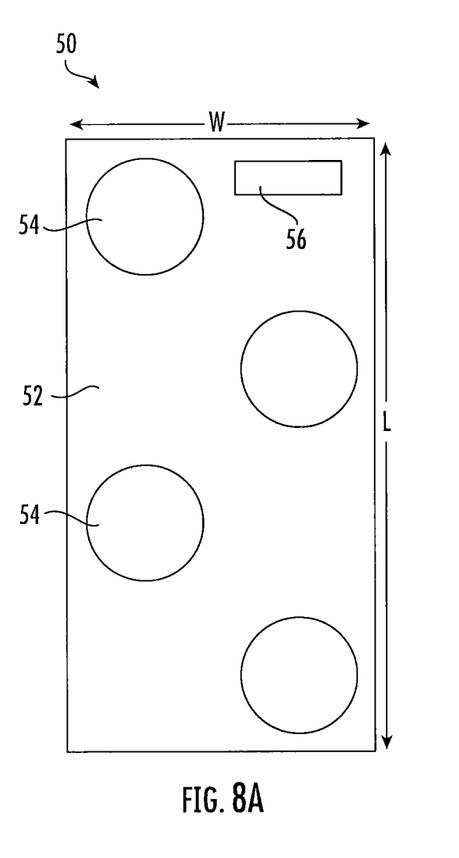
FIG. 8A is a front view of a hoisting grip according to additional embodiments of the present invention.
Figure 8B:
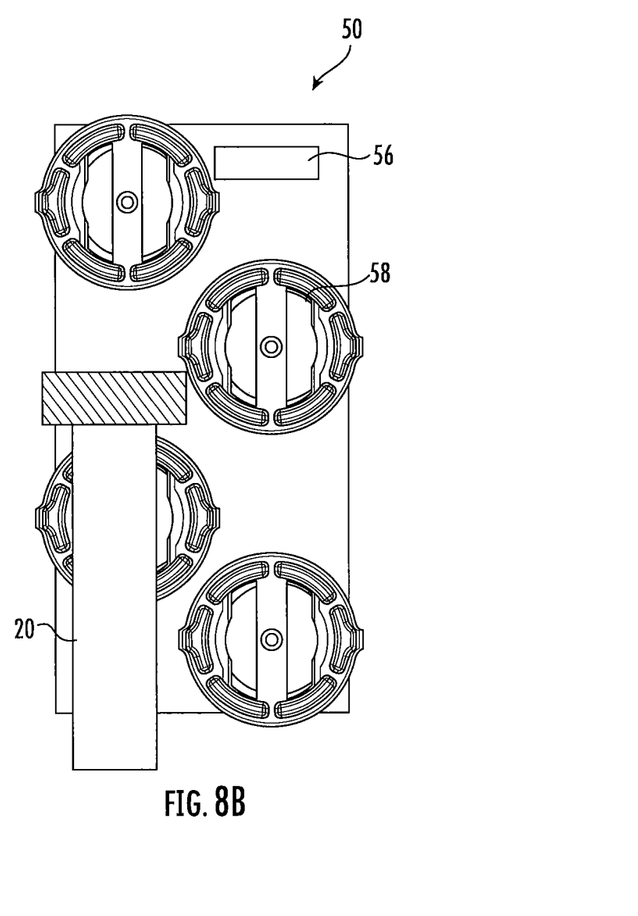
FIG. 8B is the hoisting grip of FIG. 8A in combination with cable hangers, wherein one of the cable hangers securing a cable to the hoisting grip.

Referring now to FIGS. 8A and 8B, a hoisting grip assembly 50 according to additional embodiments of the present invention is illustrated. The hoisting grip assembly 50 comprises a main body 52. The main body 52 of the hoisting grip assembly 50 has a length (L), a width (W) and a thickness (T). In some embodiments, the hoisting grip assembly 50 has a length (L) of about 75 mm to about 400 mm, a width (W) of about 25 mm to about 100 mm, and a thickness (T) of about 3 mm to about 5 mm.

In some embodiments, the hoisting grip assembly 50 may have a plurality of apertures 54 (FIG. 8A). In some embodiments, the plurality of apertures 54 may be off-centered from a longitudinal axis of the main body 52. In some embodiments, the apertures 54 may be arranged in a straight line along a longitudinal axis of the main body 52 of the hoisting grip assembly 50. These apertures 54 may be adapted to receive a cable hanger 58. The cable hanger 58 may be configured to hold a cable 20. Exemplary types of cable hangers 58 that may be used with the hoisting grip assembly 50 include, but are not limited to, SnapStak® Plus hangers and related adapters available from CommScope®. See, for example, U.S. patent application Ser. No. 15/664,493, which is incorporated by reference in its entirety herein. In some embodiments, at least one of the apertures 54 may be adapted to receive a hoisting member 42 (see, e.g., aperture 56).

As shown in FIG. 8B, in some embodiments, the hoisting grip assembly 50 may have at least one cable hanger 58 received in one of the apertures 54. A cable 20 can be secured in the cable hanger 58. With at least one cable 20 secured in the hoisting grip assembly 50, the hoisting grip assembly 50 can be lifted by a hoisting member 42 up a mounting structure 40 for installation of the cable 20. The diameter of the apertures 54, 56 can vary depending on the size of cable hangers 58. In some embodiments, the apertures 54, 56 may have a diameter of about 6 mm to about 25 mm, typically a diameter of about 18 mm to about 20 mm.

In some embodiments, the main body 52 of the hoisting grip assembly 50 may be formed from a polymeric material. In some embodiments, the polymeric material may comprise polypropylene, polyvinyl chloride, polycarbonate, or the like.

Figure 9A:
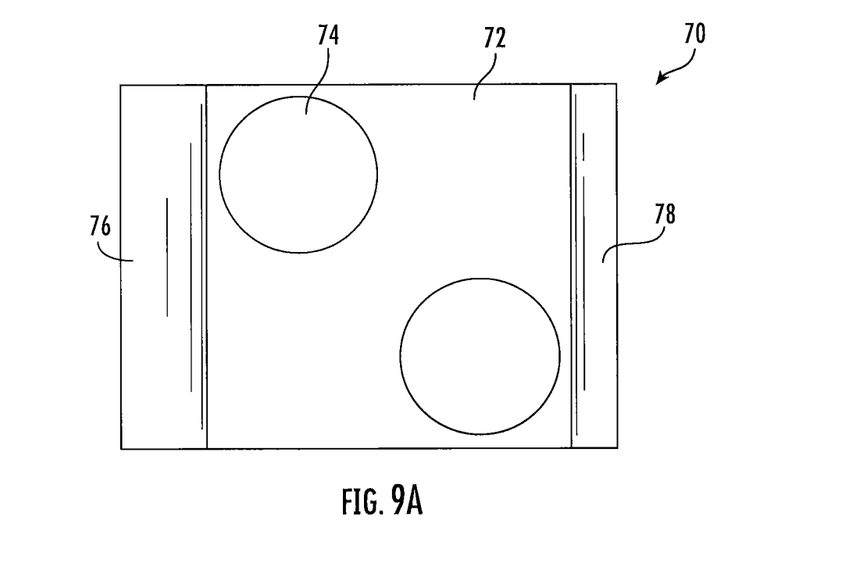
FIG. 9A is a front view of a hoisting grip module according to further embodiments of the present invention.
Figure 9B:
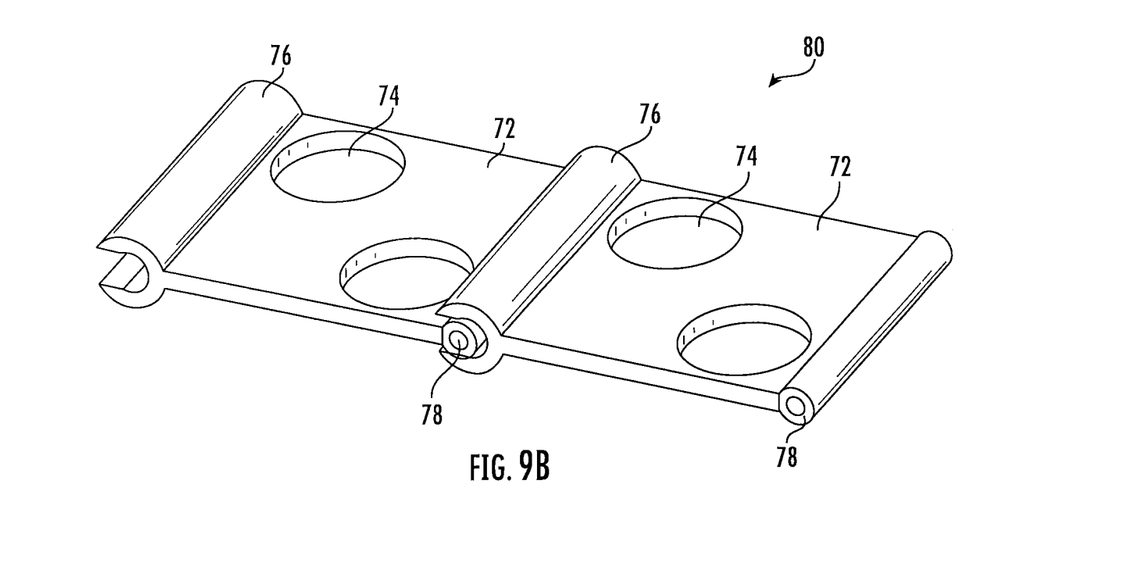
FIG. 9B is a front perspective view of two hoisting grip modules of FIG. 9A connected together.

Referring now to FIGS. 9A and 9B, a hoisting grip assembly 80 according to further embodiments of the present invention is illustrated. The hoisting grip assembly 80 comprises at least one module 70 having main body 72. The main body 72 has a length (L), a width (W) and a thickness (T). In some embodiments, the hoisting grip assembly 80 has a length (L) of about 75 mm to about 400 mm, a width (W) of about 25 mm to about 100 mm, and a thickness (T) of about 3 mm to about 5 mm.

In some embodiments, the modules 70 comprise a plurality of apertures 74. In some embodiments, the plurality of apertures 74 may be off-centered from a longitudinal axis of the main body 72. In some embodiments, the apertures 74 may be arranged in a straight line along a longitudinal axis of the main body 72 of the hoisting grip assembly 80. The apertures 74 may be adapted to receive a cable hanger 58 and a cable 20 may be secured in the cable hanger 58.

In some embodiments, the modules 70 may further comprise a first connecting member 76 and a second connecting member 78. The first connecting member 76 may extend the length of one end of the main body 72 and a second connecting member 78 may extend the length of an end of the main body 72 opposite from the first connecting member 76. In some embodiments, the first connecting member 76 may be sized to receive the second connecting member 78 of another module 70. In some embodiments, the second connecting member 78 may be sized to be optionally received by the first connecting member 76 of another module 70.

In some embodiments, the hoisting grip assembly 80 may comprise multiple modules 70 that are connected to each other by their first and second connecting members 76, 78. When the hoisting grip assembly 80 comprises multiple modules 70, the hoisting grip assembly 80 may further comprise a locking member (not shown) to secure the modules 70 together. With at least one cable 20 secured in the hoisting grip assembly 80, the hoisting grip assembly 80 can be lifted by a hoisting member 42 up a mounting structure 40 for installation of the cable 20.

Figure 10:
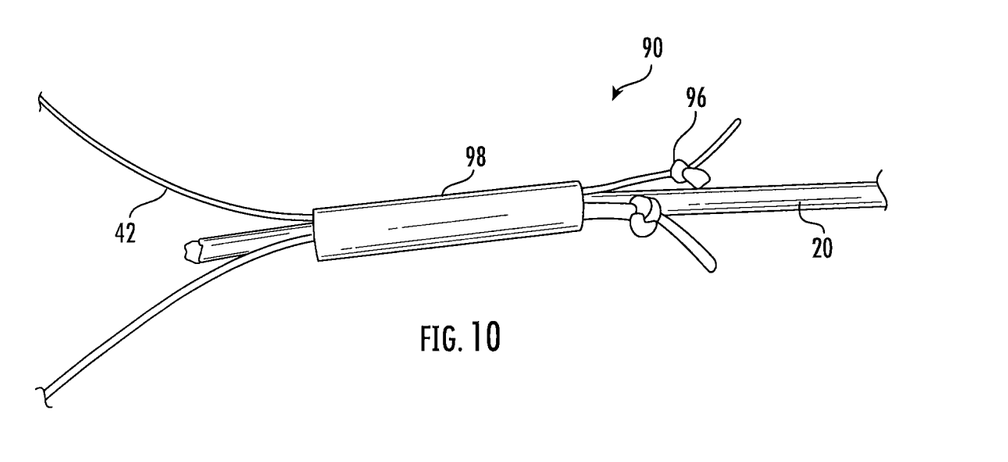
FIG. 10 is a front perspective view of a hoisting grip assembly according to still further embodiments of the present invention.

Referring now to FIG. 10, according to further embodiments, a hoisting grip assembly 90 is illustrated. The hoisting grip assembly 90 may comprise a cable 20, at least one hoisting member 42, and a clamping member 98. In some embodiments, the hoisting member 42 may have a knot tied at one end. The clamping member 98 may surround the cable 20 and the hoisting member 42. The clamping member 98 can secure the hoisting member 42 together with the cable 20. In some embodiments, the clamping member 98 may be formed from a cold shrink material. Exemplary types of products that may be used for the clamping member 98 include, but are not limited to, cold shrink kits available from CommScope®, an oetiker clamp, or the like. Using a clamping member 98 can help provide a more controlled compressive force on the cable 20 (as compared to a hose clamp), thereby reducing the potential of damaging the cable 20. Using the hoisting grip assembly 90, the hoisting member 42 in combination with the cable 20 can then be lifted by the hoisting member 42 up a mounting structure 40 for installation of the cable 20.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A hoisting grip, comprising:
a main body formed of a polymeric material having a generally flat profile, the main body having a length, a width, a thickness, and a longitudinal axis and comprising a plurality of apertures, wherein at least one aperture is adapted to receive a hoisting member and at least two apertures are adapted to receive a cable; and
at least two laces integral with an end of the main body and adapted to secure the cable.

2. The hoisting grip of claim 1, in combination with a cable, wherein the cable is received through at least two apertures and the at least two laces are knotted around the cable, thereby securing the cable in the hoisting grip.

3. The hoisting grip claim 2, wherein the main body has a serpentine profile when the cable is inserted into at least two apertures and the hoisting grip is extended.

4. The hoisting grip of claim 1, wherein the polymeric material comprises polyurethane or rubber.

5. The hoisting grip of claim 1, wherein the plurality of apertures is adapted to receive a cable have a diameter of about 6 mm to about 25 mm.

6. The hoisting grip of claim 1, wherein the plurality of apertures is a first plurality of apertures, the main body further comprising a second plurality of apertures adapted to receive a second cable.

7. The hoisting grip of claim 1, wherein the hoisting grip comprises at least two pairs of laces.

8. A hoisting grip assembly, comprising:
a hoisting grip, the hoisting grip having a main body having a generally flat profile and formed of a polymeric material, the main body having a length, a width, a thickness, and a longitudinal axis and comprising a plurality of apertures, wherein at least one aperture is adapted to receive a hoisting member; and
at least one cable hanger received in one of the apertures, wherein a cable is secured in the cable hanger.

9. The hoisting grip assembly of claim 8, wherein the plurality of apertures are off-center relative to the longitudinal axis of the main body.

10. The hoisting grip assembly of claim 8, wherein the polymeric material comprises polypropylene, polyvinyl chloride, or polycarbonate.

11. The hoisting grip assembly of claim 8, wherein the plurality of apertures have a diameter of about 6 mm to about 25 mm.

12. A hoisting grip assembly, comprising:
at least one module having a main body with a length and a width comprising:
a plurality of apertures;
a first connecting member extending the length of one end of the main body;
a second connecting member extending the length of an end of the main body opposite from the first connecting member, wherein the first connecting member is sized to receive the second connecting member of another module and the second connecting member is sized to be optionally received by the first connecting member of another module;
at least one cable hanger received in one of the apertures, wherein a cable is secured in the cable hanger.

13. The hoisting grip assembly of claim 12, wherein the plurality of apertures are off-center relative to the longitudinal axis of the main body.

* * * * *